United States Patent
Botros et al.

(12)

(10) Patent No.: US 8,426,030 B2
(45) Date of Patent: Apr. 23, 2013

(54) BUTENE COPOLYMER-CONTAINING ADHESIVE BLENDS

(75) Inventors: Maged G. Botros, Liberty Township, OH (US); Charles S. Holland, Springboro, OH (US)

(73) Assignee: Equistar Chemicals, LP, Houston, TX (US)

( * ) Notice: Subject to any disclaimer, the term of this patent is extended or adjusted under 35 U.S.C. 154(b) by 378 days.

(21) Appl. No.: 12/592,663

(22) Filed: Dec. 1, 2009

(65) Prior Publication Data

US 2011/0129666 A1    Jun. 2, 2011

(51) Int. Cl.
- *B32B 27/32* (2006.01)
- *C09J 123/06* (2006.01)
- *C09J 123/18* (2006.01)
- *C09J 151/06* (2006.01)

(52) U.S. Cl.
USPC ........................ 428/523; 525/70; 525/74

(58) Field of Classification Search ............ 428/523; 525/70, 74
See application file for complete search history.

(56) References Cited

U.S. PATENT DOCUMENTS

| 4,087,587 | A |   | 5/1978  | Shida et al. |
| 4,298,712 | A |   | 11/1981 | Machonis, Jr. et al. |
| 4,487,885 | A |   | 12/1984 | Adur et al. |
| 4,774,144 | A |   | 9/1988  | Jachec et al. |
| H568      | H | * | 1/1989  | Tanaka et al. ............ 525/71 |
| 5,367,022 | A |   | 11/1994 | Kiang et al. |

FOREIGN PATENT DOCUMENTS

| EP | 0 201 996 A2 | 11/1986 |
| WO | 2008/018949 A1 | 2/2008 |
| WO | WO 2009/000637 | 12/2008 |

OTHER PUBLICATIONS

PCT International Search Report For Corresponding PCT/US2010/056521, Search Report Mailed Jan. 21, 2011.

* cited by examiner

*Primary Examiner* — Jeffrey Mullis

(57) ABSTRACT

Compositions suitable for use as adhesives in multi-layer structures. The compositions comprise a blend of an ethylene copolymer of butene and a propylene-based polymer; a polyolefin grafted with an ethylenically unsaturated carboxylic acid or acid derivative; and an olefin polymer resin different than the ethylene copolymer of butene, the propylene-based polymer and the grafted polyolefin.

12 Claims, No Drawings

BUTENE COPOLYMER-CONTAINING ADHESIVE BLENDS

FIELD OF THE INVENTION

The invention relates to adhesive compositions comprising a blend of an ethylene copolymer of butene and a propylene-based polymer; a polyolefin grafted with an ethylenically unsaturated carboxylic acid or acid derivative; and an olefin polymer resin.

BACKGROUND OF THE INVENTION

Over the past decade, the demand for composite materials in the areas of transportation, building and storage, and various other industries has increased. This trend is a result of the flexibility and cost efficiency such systems offer relative to conventional products. For example, in transportation, panels used in semi-trailers, truck bodies, and portable storage containers have traditionally been fabricated from steel, aluminum, wood or fiberglass-reinforced materials. However, all-metal construction is expensive and heavy, and fiberglass and wood can gouge or splinter. Moreover, wood products such as plywood can delaminate or absorb moisture, potentially reducing the lifetime of the panel due to rotting. Similar problems are faced in the construction industry with the fabrication of structures using conventional products.

Composite systems offer the flexibility to combine the advantages of a variety of materials in their core and facing layers, so that products can be designed and fabricated to optimize price and performance. A wide variety of materials are available. For example, core materials can include products such as polypropylene or polyethylene-based materials, aluminum, styrofoam, paper and polycarbonate. Facing materials can include products such as fiberglass-reinforced plastic, metals such as stainless steel and aluminum, acrylonitrile-butadiene-styrene, and various other polymer products.

One challenge facing composite systems, however, is the need to bond the various layers together. This is particularly a concern when bonding adjacent dissimilar materials. For example, in multilayer films tie layers produced from adhesive composition layers are typically positioned between the dissimilar layers to be bonded, and the layers then adhered by conventional means.

Other applications require good adhesion between a metal and an adjacent layer. For example, nail guns often use nail-collation tape to load nails into the gun, where the nails are adhered to the tape using an adhesive layer. Still other applications include wire and cable, where an aluminum wire must be adhered to the outer layer of low density polyethylene. In composite multilayer pipe applications, an aluminum interior layer is often sandwiched between interior and exterior layers of polypropylene, polyethylene or cross-linked polyethylene. In these structures, adhesive composition layers are required between the polyolefins and aluminum.

Various adhesive compositions have been proposed. For example, functionalized polyolefins have been combined with a base polymer and poly(isobutylene) or high ethylene content materials such as ethylene-propylene copolymers or ethylene-propylene-diene terpolymers, for example as described in U.S. Pat. Nos. 4,087,587, 4,298,712, 4,487,885, 4,774,144, and 5,367,022. However, a continuing need exists for compositions providing superior levels of adhesion for today's demanding applications. It has unexpectedly been found that compositions comprising a blend of an ethylene copolymer of butene and a propylene-based polymer; a polyolefin grafted with an ethylenically unsaturated carboxylic acid or acid derivative; and an olefin polymer resin different than the ethylene copolymer of butene, the propylene-based polymer and the grafted polyolefin, exhibits superior adhesion performance.

SUMMARY OF THE INVENTION

The present invention relates to an adhesive composition comprising 12 to 60 wt % of a blend comprising 75 to 95 wt % of a butene-1 copolymer comprising 80 to 98 wt % butene-1 and 2 to 20 wt % ethylene and 5 to 25 wt % of a propylene-based polymer; 2 to 20 wt % of a polyolefin grafted with an ethylenically unsaturated carboxylic acid or acid derivative; and 20 to 86 wt % of an olefin polymer resin different from the butene-1 copolymer, the propylene-based polymer and the grafted polyolefin. The present invention also relates to multilayer structures comprising the adhesive composition.

DETAILED DESCRIPTION OF THE INVENTION

The adhesive compositions of the invention are comprised of a blend of a butene-1 copolymer with ethylene and a propylene-based polymer; a polyolefin grafted with an ethylenically unsaturated carboxylic acid or acid derivative; and an olefin polymer resin different from the ethylene copolymer of butene, the propylene-based polymer and the grafted polyolefin.

Blend

The blend useful in the adhesion compositions comprises 75 to 95 wt % of a butene-1 copolymer comprising 80 to 98 wt % butene-1 and 2 to 20 wt % ethylene, and 5 to 25 wt % a propylene-based polymer. The propylene-based polymer is preferably selected from a homopolymer of propylene, a copolymer of propylene and 0.5 to 10 wt % of either ethylene or butene-1, a terpolymer comprising 75 to 98 wt % propylene, 1 to 10 wt % ethylene and 1 to 15 wt % butene-1, or mixtures thereof. Preferably, the blend comprises 80 to 94 wt % of the butene-1 copolymer and 6 to 20 wt % of the propylene-based polymer. More preferably, the blend comprises 85 to 94 wt % of the butene-1 copolymer and 6 to 15 wt % of the propylene-based polymer. The blend melt flow rate is preferably 0.4 to 5, more preferably 0.5 to 2.5.

The butene/ethylene copolymer preferably comprises 85 to 97 wt % butene-1 and 3 to 15 wt % ethylene. More preferably, the copolymer comprises 90 to 95 wt % butene-1 and 5 to 10 wt % ethylene. The copolymer is preferably produced using a metallocene polymerization catalyst of the formula (I):

$$(Cp)(ZR^7{}_m)_n(A)_r ML_p \qquad (I)$$

wherein $(ZR^7{}_m)_n$ is a divalent group bridging Cp and A; Z is C, Si, Ge, N or P, and the $R^7$ groups, equal to or different from each other, are hydrogen or a $C_1$-$C_{20}$ hydrocarbon radicals;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is O, S, $NR^8$, $PR^8$ wherein $R^8$ is hydrogen, a $C_1$-$C_{20}$ hydrocarbon radicals, or A has the same meaning of Cp;

M is a transition metal belonging to group 4, 5 or to the lanthanide or actinide groups of the Periodic Table of the Elements (IUPAC version);

the substituents L, equal to or different from each other, are monoanionic sigma ligands selected from the group consisting of hydrogen, halogen, $R^9$, $OR^9$, $OCOR^9$, $SR^9$, $NR^9{}_2$ and $PR^9{}_2$, wherein $R^9$ is a or a $C_1$-$C_{20}$ hydrocarbon radicals, optionally containing one or more Si or Ge atoms;

m is 1 when Z is N or P, and is 2 when Z is C, Si or Ge;

n is an integer ranging from 0 to 4, being 0 when r is 0;

r is 0, 1 or 2; preferably r is 0 or 1;

p is an integer equal to the difference between the oxidation state of the metal M and the quantity (r+1).

The butene/ethylene copolymer preferably has a flexural modulus, as measured by ASTM D790-92 of at most 60 MPa, preferably at most 40 MPa, more preferably at most 30 MPa; and a molecular weight distribution, as measured by Gel Permeation Chromatography, of preferably less than 3. The elastomer also preferably has a melting enthalpy after ten days of aging at room temperature, of less than 25 J/g, more preferably from 4 to 20 J/g.

When the propylene-based polymer is a propylene copolymer, the copolymer is preferably a propylene copolymer with 1 to 5 wt % of ethylene, more preferably a propylene copolymer with 2 to 4 wt % of ethylene. Preferably, the propylene-based polymer is a terpolymer comprising 79 to 98 wt % propylene, 1 to 10 wt % ethylene and 1 to 15 wt % butene-1. More preferably, the propylene-based polymer is a terpolymer comprising 82 to 96 wt % propylene, 2 to 8 wt % ethylene and 2 to 10 wt % butene-1. Most preferably, the propylene-based polymer is a terpolymer comprising 86 to 95 wt % propylene, 2 to 6 wt % ethylene, and 3 to 8 wt % butene-1.

The propylene-based polymer preferably has a melt flow rate (MFR), as measure by ASTM D1238 at 230° C., 2.16 kg, of 0.5 to 10, more preferably from 0.6 to 2.0.

Grafted Polyolefin

The grafted polyolefin comprises acid or acid derivative functionality, and is obtained by reacting ethylenically unsaturated carboxylic acids and carboxylic acid anhydrides, or derivatives thereof, with polyethylene or polypropylene under grafting conditions. The grafting monomers, i.e., acid, anhydride or derivative, are incorporated along the polyethylene or polypropylene backbone. When the grafted polyolefin is obtained by grafting polyethylene, the polyethylene to be grafted includes ethylene homopolymers and copolymers of ethylene with propylene, butene, 4-methyl pentene, hexene, octene, or mixtures thereof. When the grafted polyolefin is obtained by grafting polypropylene, the polypropylene to be grafted includes propylene homopolymers and copolymers of propylene with ethylene or $C_4$-$C_{10}$ α-olefins. Preferably, the grafted polyolefin is obtained by grafting polyethylene. More preferably, the polyethylene to be grafted is HDPE or LLDPE. Most preferably, the polyethylene to be grafted is HDPE.

Carboxylic acids or anhydrides useful as grafting monomers include compounds such as acrylic acid, maleic acid, fumaric acid, citaconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride 2-oxa-1,3-diketospiro(4,4)non-7-ene, bicyclo (2.2.1)hept-5-ene-2,3-dicarboxylic acid or anhydride, tetrahydrophthalic acid or anhydride, x-methylbicyclo(2.2.1) hept-5-ene-2,3-dicarboxylic acid or anhydride, nadic anhydride, methyl nadic anhydride, himic anhydride, and methyl himic anhydride. Maleic anhydride is a particularly useful grafting monomer. Acid and anhydride derivatives which can be used to graft the polyethylene or polypropylene include dialkyl maleates, dialkyl fumarates, dialkyl itaconates, dialkyl mesaconates, dialkyl citraconates and alkyl crotonates.

Grafting is accomplished by thermal and/or mechanical means in accordance with known procedures, with or without a free-radical generating catalyst such as an organic peroxide, where the grafted sample is prepared by heating a mixture of the polyolefin and graft monomer(s), with or without a solvent, while subjecting it to high shear. Preferably, the grafted products are prepared by melt blending the polyethylene or polypropylene in the substantial absence of a solvent, in the presence of the grafting monomer in a shear-imparting reactor, such as an extruder. Twin screw extruders such as those marketed by Werner-Pfleiderer under the designations ZSK-30, ZSK-53, ZSK-83, ZSK-90 and ZSK-92 are especially useful for carrying out the grafting operation. Preferably, the amount of acid or acid derivative comonomer(s) grafted onto the polyethylene or polypropylene ranges from 0.1 to 4 weight percent, preferably from 0.5 to 3.0 weight percent. Preferably, when maleic anhydride is grafted onto HDPE or LLDPE, the grafted maleic anhydride concentration is 0.5 to 4 weight percent. Melt indexes of the grafted ethylene polymers (MIs) as measured by ASTM D 1238, at 190° C., 2.16 kg, are preferably 1 to 20 dg/min.

The grafting reaction is carried out at a temperature selected to minimize or avoid rapid vaporization and consequent losses of the graft monomer and any catalyst that may be employed. The graft monomer concentration in the reactor is typically about 1 to about 5 wt % based on the total reaction mixture weight. A temperature profile where the temperature of the polyolefin melt increases gradually through the length of the extruder/reactor up to a maximum in the grafting reaction zone and then decreases toward the reactor exit is preferred. The maximum temperature within the reactor should be such that significant vaporization losses and/or premature decomposition of any peroxide catalyst are avoided. The grafting monomer and any catalyst used are preferably added in neat form to the extruder/reactor.

Olefin Polymer Resin

The olefin polymer resin useful in the adhesive compositions can be a propylene polymer, an ethylene polymer or mixtures thereof, provided that it is different than the butene-1 copolymer, the propylene-based polymer and the grafted polyolefin. When the olefin polymer resin is a propylene polymer, it is selected from propylene homopolymers, random copolymers or impact copolymers of propylene comprising up to 30 wt % of comonomers selected from ethylene or $C_{4-8}$ α-olefins. When the olefin polymer resin is a propylene polymer, preferably it is a propylene homopolymer having a crystallinity, as measured by wide angle x-ray diffraction, of greater than 40%, or propylene copolymers preferably comprising from 1 to 10 wt %, more preferably, from 1 to 5 wt % ethylene. Melt flow rates of the propylene polymer, are typically 0.1 to 100 dg/min., preferably, 5 to 50 dg/min.

When the olefin polymer resin is an ethylene polymer, it is preferably selected from ethylene homopolymers, ethylene copolymers or mixtures thereof, where the comonomer is chosen from propylene, $C_{4-8}$ α-olefins, vinyl carboxylates, acrylic and methacrylic acids and esters, or mixtures thereof. Ethylene homopolymers and ethylene-$C_{4-8}$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm³, as measured by ASTM D 792. LDPE and LLDPE are defined as having densities in the range 0.910 to 0.930 g/cm³. MDPE is defined as having a density of 0.930 to 0.945 g/cm³. HDPE is defined as having a density of at least 0.945 g/cm³, preferably, from 0.945 to 0.969 g/cm³. The ethylene homopolymers and copolymers typically have an MI from 0.01 to 400 dg/min, preferably, from 0.1 to 200 dg/min., more preferably from 1 to 100 dg/min.

Preferably, the olefin polymer resin is selected from ethylene homopolymers, ethylene copolymers with propylene, ethylene copolymers with $C_{4-8}$ α-olefins or mixtures thereof. Preferably, the olefin polymer resin has a crystallinity, as measured by either wide angle x-ray diffraction or differential scanning calorimetry, of greater than 30 wt %. More preferably, the olefin polymer resin is HDPE having a crystallinity greater than 50 wt %, preferably greater than 55 wt %, or LLDPE having a crystallinity greater than 40%, preferably greater than 45 wt %, or mixtures of HDPE and LLDPE.

Adhesive compositions of the invention comprise 12 to 60 wt % of the blend; 2 to 20 wt % of the polyolefin grafted with the ethylenically unsaturated carboxylic acid or acid derivative; and 20 to 86 wt % of the olefin polymer resin. Preferably, the adhesive composition comprise 15 to 45 wt % of the blend; 5 to 15 wt % of the grafted polyolefin; and 40 to 80 wt % of the olefin polymer resin. More preferably, the adhesive composition comprise 18 to 40 wt % of the blend; 6 to 12 wt % of the grafted polyolefin; and 48 to 76 wt % olefin polymer resin.

Additives, Stabilizers, and Fillers

The adhesive compositions of the invention can further comprise additives such as stabilizers, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, flow-control agents, optical brighteners, flame-proofing agents, antistatic agents, blowing agents, and mixtures thereof, which can be added in amounts well known to those skilled in the art.

The adhesives can be prepared by any conventional method well known to those skilled in the art, where combination of the components can be conducted in any sequence. For example, all of the components can be first melt blended in conventional blending equipment, with the blended material then being extruded. Alternately, some of the components can be blended prior to extrusion, with the remainder of the components being introduced after blending but upstream of the extruder, or at the extruder itself. The components can also be combined in a series of extrusion steps.

Multilayer Structures

The adhesive compositions of the invention can be used in a variety of applications for bonding polyolefins, various other polymers, metals, fiberglass, paper, glass, and wood to produce multilayer structures. For example, the compositions may be used as tie-layers for bonding one or more polyolefins, ionomers, epoxys, polyesters, polyamides, ethylene-vinyl alcohol copolymers and metal layers in multi-layer films. The polyolefins can include ethylene and propylene homopolymers and copolymers of ethylene with $C_{3-8}$ alpha-olefins, alkyl (meth)acrylates and vinyl carboxylates. Representative resins of this type include, but are not limited to, LDPE, LLDPE, HDPE, polypropylene, ethylene-vinyl acetate copolymer (EVA), ethylene-methyl acrylate copolymer (EMA) and ethylene-n-butyl acrylate copolymer (EnBA). Polybutylene terephthalate and polyethylene terephthalate are examples of useful polyester resins. Typical polyamides can include nylon 6, nylon 6,6, nylon 12, nylon 6,12 and nylon 6,66. Ethylene vinyl alcohol (EVOH) obtained by the saponification/hydrolysis of EVA is also a highly useful resin to impart barrier properties, particularly for film applications. The adhesive tie layers for film can be used in lamination, extrusion and coextrusion processes, e.g., blown or cast film extrusion/coextrusion, sheet extrusion/coextrusion, extrusion/coextrusion lamination, extrusion/coextrusion coating, injection blow molding, melt thermoforming and the like for flexible structures.

The adhesive compositions can also be used in rigid and semi-rigid containers having structural layers, as commonly used for food packaging or food storage applications. A typical construction of this type would include one or more food contact or sealing layers, a barrier layer and one or more structural layers. Food contact/sealing layers often include non-polar polyolefins, e.g., LDPE, while typical barrier layers comprise substrates of EVOH polyamides or the like. Structural layers may comprise polyolefins or styrene polymers which may also comprise rubber. Polystyrene and high impact polystyrene (HIPS) are widely used as structural layers, given their desirable physical properties, ease of extrusion processing, thermoforming and cutting.

The adhesive compositions can be used in the fabrication of multilayer pipes. Typically, these systems include polyolefin/adhesive/metal or EVOH/adhesive/polyolefin layers. Preferably, the systems include PEX/adhesive/metal, EVOH/adhesive/PEX, polyethylene/adhesive/metal or EVOH/adhesive/polyethylene layers, where PEX is crosslinked polyethylene.

The compositions can also be used to bond polyolefins or other materials to metals such as aluminum, steel, copper, brass, stainless steel, galvanized steel and the like. The metals can be bonded to an adjacent layer on one or both sides. Preferably, a polyolefin core layer is positioned between two outer metal layers, with the adhesive compositions serving as the tie layer between the polyolefin and the metal. These types of systems are widely used in metal lamination for composite building panels and composite truck-trailer panels. The polyolefin core layer is preferably HDPE, LLDPE or LDPE. The core layer polyolefin can comprise additives and fillers well known in the art to provide the properties necessary for a particular application, e.g., anti-oxidants, UV stabilizers, fire retardants and foaming agents.

In each of these structures and their associated applications, physical and mechanical properties are dependent on the strength of the bond between the adhesive layer and the adjacent layer(s) it is bonded to. Inadequate adhesion can result in delamination and loss of structural integrity.

Preferably, the adhesive compositions are used to adhere polyolefins to metal. More preferably, the adhesive compositions are used to adhere polyolefins to aluminum.

The following examples illustrate the invention; however, those skilled in the art will recognize numerous variations within the spirit of the invention and scope of the claims.

Adhesive compositions of the examples were prepared using the following olefin polymer base resin, grafted polyolefin, and elastomer components:

BR-1 HDPE having a density of 0.951 g/cm$^3$ and an MI of 12 dg/min., commercially available from Equistar Chemicals LP.

Mgraft-1 HDPE grafted with 1.9 wt % maleic anhydride, having an MI of 9.5 dg/min and a density of 0.952 g/cm$^3$, produced by Equistar Chemicals LP.

Elast-1 A blend of 85% of a $C_4/C_2$ copolymer comprising 91.5% $C_4$ and 8.5 wt % $C_2$, having a melt flow 1.5 dg/min, a flexural modulus of 12 MPa, a molecular weight distribution as measured by GPC of 2.0, and a melting enthalpy after 10 days of 6.7 J/g, produced as in Example 4 of Intl. Publ. No. WO 2009/000637; and 15% of a terpolymer commercially available from Basell USA Inc. comprising 91 wt % $C_3$, 5.5 wt % $C_4$ and 3.5 wt % $C_2$. The blend has a melt flow of 1.4 dg/min.

Elast-2 EXACT 5062, an ethylene octene copolymer having an ethylene content of 51 wt %, a density of 0.860 and an MI of 1.1, commercially available from ExxonMobil Chemical.

Elast-3 A copolymer comprising 97 wt % $C_4$ and 3 wt % $C_3$ having a density of 0.890 and melt flow of 0.8 dg/min. commercially available from Basell USA Inc.

Elast-4 A blend comprising 65 wt % of Oppanol B-80, a polyisobutylene commercially available from BASF, and 35 wt % of an HDPE having a density of 0.951 and an MI of 12, commercially available from Equistar Chemicals LP.

Adt-1 Irganox-1010, commercially available from Ciba Chemical Company.

Adt-2 Irgafos-168, commercially available from Ciba Chemical Company.

Roller Peel Adhesion Testing

EXAMPLE 1

A 5-mil cast adhesive film was prepared by first melt blending an adhesive composition comprising 19.5 wt % Elast-1, 8 wt % Mgraft-1, 72.4 wt % BR-1, 0.05 wt % Adt-1 and 0.05 wt % Adt-2 in a ZSK-18 extruder, and then extruding the blended mixture in a Killion KL-100 extruder having a temperature profile of 145° C., 155° C., 160° C. and 170° C.

A roller peel adhesion test was conducted by preparing 6"×6" panels of aluminum, adhesive and HDPE and placing them in a structure corresponding to Al/Tie/HDPE/Tie/Al, where Al is a 22 mil aluminum layer, Tie is the adhesive film and HDPE was a 270 mil layer of a commercially available 0.96 high density polyethylene. The film panel structure was compression molded at 400° F. and 40 psig for 40 seconds, and then cooled to room temperature at 40 psig. Adhesion of the aluminum sheet to the HDPE core was determined in accordance with ASTM D3167. Adhesion was measured as 36.4 lb/in.

COMPARATIVE EXAMPLE 2

An adhesive composition comprising 10 wt % Elast-1, 10 wt % Elast-2, 10 wt % Mgraft-1, 69.9 wt % BR-1, 0.05 wt % Adt-1, and 0.05 wt % Adt-2, was melt blended and extruded into an adhesive film as in Example 1. Roller peel testing was then conducted using the adhesive film as in Example 1. Adhesion was measured as 15.1 lb/in.

COMPARATIVE EXAMPLE 3

An adhesive composition comprising 19.5 wt % Elast-3, 8 wt % Mgraft-1, 72.4 wt % BR-1, 0.05 wt % Adt-1, and 0.05 wt % Adt-2, was melt blended and extruded into an adhesive film as in Example 1. Roller peel testing was then conducted using the adhesive film as in Example 1. Adhesion was measured as 15.2 lb/in.

COMPARATIVE EXAMPLE 4

An adhesive composition comprising 30 wt % Elast-4, 8 wt % Mgraft-1, 61.9 wt % BR-1, 0.05 wt % Adt-1, and 0.05 wt % Adt-2, was melt blended and extruded into an adhesive film as in Example 1. Roller peel testing was then conducted using the adhesive film as in Example 1. Adhesion was measured as 24.9 lb/in.

Heat Seal Adhesion Testing

COMPARATIVE EXAMPLE 5

An adhesive composition comprising 5 wt % Elast-1, 8 wt % Mgraft-1, 86.9 wt % BR-1, 0.05 wt % Adt-1 and 0.05 wt % Adt-2, was prepared by melt blending the components using a ZSK-18 extruder. A cast adhesive film having a thickness of 6 mils was prepared from the blended adhesive composition on a Killion K-100 extruder. The adhesive film and a 22 mil aluminum strip were cut into 1.5"×3" coupons, and a sample arranged, where the top layer was the adhesive film and the bottom layer was the aluminum. The bars of a Sentinel heat sealer were preheated before heat sealing, by closing the heat-sealing bars for three seconds with only the top bar heated. The sample was then heat sealed at 450° F. and 40 psig for a dwell time of three seconds. Following heat sealing, the coupons were cut into 1"×3" strips for adhesion testing. Adhesion was determined on the heat-sealed sample by ASTM method D1876 in an Instron tensile tester, by measuring the force required to separate the layers in a T-Peel configuration at a cross head speed of 10 in/minute. Adhesion was measured as 0.69 lb/in.

EXAMPLE 6

An adhesive composition was prepared by melt blending 15 wt % Elast-1, 8 wt % Mgraft-1, 76.9 wt % BR-1, 0.05 wt % Adt-1 and 0.05 wt % Adt-2 as in Comparative Example 5. The blended material was heat sealed and adhesion testing conducted as in Comparative Example 5. Adhesion was measured as 2.95 lb/in.

EXAMPLE 7

An adhesive composition was prepared by melt blending 20 wt % Elast-1, 8 wt % Mgraft-1, 71.9 wt % BR-1, 0.05 wt % Adt-1 and 0.05 wt % Adt-2 as in Comparative Example 5. The blended material was heat sealed and adhesion testing conducted as in Comparative Example 5. Adhesion was measured as 3.93 lb/in.

EXAMPLE 8

An adhesive composition was prepared by melt blending 25 wt % Elast-1, 8 wt % Mgraft-1, 66.9 wt % BR-1, 0.05 wt % Adt-1 and 0.05 wt % Adt-2 as in Comparative Example 5. The blended material was heat sealed and adhesion testing conducted as in Comparative Example 5. Adhesion was measured as 4.55 lb/in.

EXAMPLE 9

An adhesive composition was prepared by melt blending 35 wt % Elast-1, 8 wt % Mgraft-1, 56.9 wt % BR-1, 0.05 wt % Adt-1 and 0.05 wt % Adt-2 as in Comparative Example 5. The blended material was heat sealed and adhesion testing conducted as in Comparative Example 5. Adhesion was measured as 6.60 lb/in.

EXAMPLE 10

An adhesive composition was prepared by melt blending 50 wt % Elast-1, 8 wt % Mgraft-1, 41.9 wt % BR-1, 0.05 wt % Adt-1 and 0.05 wt % Adt-2 as in Comparative Example 5.

The blended material was heat sealed and adhesion testing conducted as in Comparative Example 5. Adhesion was measured as 3.72 lb/in.

The present subject matter being thus described, it will be apparent that the same may be grafted or varied in many ways. Such modifications and variations are not to be regarded as a departure from the spirit and scope of the present subject matter, and all such modifications and variations are intended to be included within the scope of the following claims.

We claim:

1. An adhesive composition comprising:
   A) 12 to 60 wt % of a blend comprising:
      75 to 95 wt % of a butene-1 copolymer comprising 80 to 98 wt % butene-1 and 2 to 20 wt % ethylene; and
      5 to 25 wt % of a terpolymer comprising 75 to 98 wt % propylene, 1 to 10 wt % ethylene and 1 to 15 wt % butene-1;
   B) 2 to 20 wt % of a polyolefin grafted with an ethylenically unsaturated carboxylic acid or acid derivative; and
   C) 20 to 86 wt % of an olefin polymer resin different than the butene-1 copolymer, the terpolymer and the grafted polyolefin.

2. The adhesive composition of claim 1 wherein the blend is present in an amount from 15 to 45 wt %.

3. The adhesive composition of claim 1, wherein the blend comprises 80 to 94 wt % of the butene-1 copolymer and 6 to 20 wt % of the terpolymer.

4. The adhesive composition of claim 1 wherein the butene-1 copolymer comprises 85 to 94 wt % butene-1 and 6 to 15 wt % ethylene.

5. The adhesive composition of claim 1 wherein the terpolymer comprises 82 to 96 wt % propylene, 2 to 8 wt % ethylene and 2 to 10 wt % butene-1.

6. The adhesive composition of claim 5 wherein the terpolymer comprises 86 to 95 wt % propylene, 2 to 6 wt % ethylene, and 3 to 8 wt % butene-1.

7. A multilayer structure comprising an adhesive layer and a second layer bonded to the adhesive layer, the adhesive layer comprising:
   A) 12 to 60 wt % of a blend comprising:
      75 to 95 wt % of a butene-1 copolymer comprising 80 to 98 wt % butene-1 and 2 to 20 wt % ethylene; and
      5 to 25 wt % of a terpolymer comprising 75 to 98 wt % propylene, 1 to 10 wt % ethylene and 1 to 15 wt % butene-1;
   B) 2 to 20 wt % of a polyolefin grafted with an ethylenically unsaturated carboxylic acid or acid derivative; and
   C) 20 to 86 wt % of an olefin polymer resin different than the butene-1 copolymer, the terpolymer and the grafted polyolefin.

8. The multilayer structure of claim 7 wherein the blend is present in an amount from 15 to 45 wt %.

9. The multilayer structure of claim 7 wherein the blend comprises 80 to 94 wt % of the butene-1 copolymer and 6 to 20 wt % of the terpolymer.

10. The multilayer structure of claim 7 wherein the butene-1 copolymer comprises 85 to 94 wt % butene-1 and 6 to 15 wt % ethylene.

11. The multilayer structure of claim 7 wherein the terpolymer comprises 82 to 96 wt % propylene, 2 to 8 wt % ethylene and 2 to 10 wt % butene-1.

12. The multilayer structure of claim 11 wherein the terpolymer comprises 86 to 95 wt % propylene, 2 to 6 wt % ethylene, and 3 to 8 wt % butene-1.

* * * * *